United States Patent
Li et al.

(10) Patent No.: US 12,380,124 B2
(45) Date of Patent: Aug. 5, 2025

(54) DOCUMENT CONTENT SEARCH INDEX

(71) Applicant: INTERNATIONAL BUSINESS MACHINES CORPORATION, Armonk, NY (US)

(72) Inventors: Dong Rui Li, Beijing (CN); Xue Lan Zhang, Beijing (CN); Xue Xu, Beijing (CN); Zai Ming Lao, Beijing (CN); Ye Chen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/241,302

(22) Filed: Sep. 1, 2023

(65) Prior Publication Data

US 2025/0077539 A1  Mar. 6, 2025

(51) Int. Cl.
  *G06F 16/00* (2019.01)
  *G06F 16/25* (2019.01)
  *G06F 16/93* (2019.01)

(52) U.S. Cl.
  CPC ......... *G06F 16/254* (2019.01); *G06F 16/93* (2019.01)

(58) Field of Classification Search
  CPC ........ G06F 16/23; G06F 16/93; G06F 16/951; G06F 16/178; G06F 16/22; G06F 16/29; G06F 16/953; G06F 18/251; G06F 40/103; G06F 8/48; G06F 40/197; G06F 40/237; G06F 40/279; G06F 40/166; G06F 40/117; G06F 40/30; G06F 16/31; G06F 40/216; G06F 40/35; G06F 40/44; G06F 16/248; G06F 16/322; G06F 16/328; G06F 16/345; G06F 16/367; G06F 40/20; G06F 40/205; G06F 40/211; G06F 40/40; G06F 40/45; G06F 40/58; G06F 2115/00; G06F 2117/00; G06F 2119/00; G06F 2123/00; G06F 2201/00; G06F 2203/00; G06F 16/316; G06F 16/319; G06F 16/242; G06F 16/81; G06F 16/835; G06F 16/901; G06F 40/289; G06F 9/451; G06F 9/453; G06F 9/547
  See application file for complete search history.

(56) References Cited

U.S. PATENT DOCUMENTS 10,776,434 B1 * 9/2020 Blackman ........... G06F 16/3344
10,977,284 B2   4/2021 Chen et al.
11,030,242 B1   6/2021 Borthakur et al.
(Continued)

FOREIGN PATENT DOCUMENTS

CN  111639151  9/2020
CN  115705353  2/2023

OTHER PUBLICATIONS

Jagtap., "Document layout analysis model byForm Recognizer adds new structure insights", https://techcommunity.microsoft.com/t5/azure-ai-services-blog/document-layout-analysis-model-by-form-recognizer-adds-new/ba-p/3642004, Oct. 3, 2022; 25 Pages.

(Continued)

*Primary Examiner* — Shyue Jiunn Hwa
(74) *Attorney, Agent, or Firm* — Lily Neff; Andrew D. Wright; Calderon Safran & Wright P.C.

(57) ABSTRACT

A system, method, and computer program product are configured to extract key value pair (KVP) data from one or more documents; obtain a content index for the one or more documents; and enhance the content index with the KVP data to provide a KVP content index.

20 Claims, 9 Drawing Sheets

(56) References Cited

U.S. PATENT DOCUMENTS

| | | | |
|---|---|---|---|
| 11,249,974 B1* | 2/2022 | Fuchs | G06F 16/2255 |
| 2011/0022600 A1 | 1/2011 | Sathe et al. | |
| 2020/0394243 A1* | 12/2020 | Blackman | G06F 16/9535 |
| 2021/0209082 A1 | 7/2021 | Larson | |
| 2021/0294970 A1* | 9/2021 | Bender | G06F 16/3329 |

OTHER PUBLICATIONS

Karim et al., "Enhance Inverted Index Using in Information Retrieval", https://www.researchgate.net/publication/305046191_Enhance_Inverted_Index_Using_in_Information_Retrieval, Jan. 2016; 11 Pages.

IBM ., "Overview of Content Search Services", https://www.ibm.com/docs/en/filenet-p8-platform/5.5.x?topic=retrieval-overview-content-search-services, Febuary 9, 2023; 1 Page.

IBM., "What is IBM Automation® Document Processing?", https://www.ibm.com/products/document-processing, Accessed Aug. 30, 2023; 8 Pages.

* cited by examiner

Brilliant Repair Shop
90 Fixed Street
Carson City, NV 89701
Phone: 775-555-6789

B S

INVOICE

INVOICE # 03-8508
DATE: 02/15/16

To:
Busy Car Repair
100 Auto Road
Salt Lake City, UT 84101
Phone: 801-555-1234

Ship To:
Busy Car Repair
100 Auto Road
Salt Lake City, UT 84101
Phone: 801-555-1234

DOCUMENT CONTENT SEARCH INDEX

BACKGROUND

Aspects of the present invention relate generally to indexing of electronically stored documents and, more particularly, to indexing of electronically stored documents using key-value pairs (KVP).

Content search refers to searching some text inside extensive content data stored electronically and returning results that contain some or all of the words from a query. Usually, to conduct the search, keywords are entered in the query, and a computer system searches for the documents containing the keywords and returns documents containing the keywords.

A KVP is a data type that includes two elements: a set of associated values and a group of key identifiers. Within a KVP, the two data elements are related. The first data element (i.e., the key) is a constant used to define the data set. The second data element (i.e., the value) is a variable belonging to the data set. For example, the key may be produce and a value may be carrot, cucumber, or lettuce. The carrot, cucumber, or lettuce is a variable belonging to the data set of produce.

SUMMARY

In a first aspect of the invention, there is a computer-implemented method including: extracting, by a processor set, key value pair (KVP) data from one or more documents; obtaining, by the processor set, a content index for the one or more documents; and enhancing, by the processor set, the content index with the KVP data to provide a KVP content index.

In another aspect of the invention, there is a computer program product including one or more computer readable storage media having program instructions collectively stored on the one or more computer readable storage media. The program instructions are executable to: extract key value pair (KVP) data from one or more documents; obtain a content index for the one or more documents; and enhance the content index with the KVP data to provide a KVP content index.

In another aspect of the invention, there is a system including a processor set, one or more computer readable storage media, and program instructions collectively stored on the one or more computer readable storage media. The program instructions are executable to: extract key value pair (KVP) data from one or more documents; obtain a content index for the one or more documents; and enhance the content index with the KVP data to provide a KVP content index.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Aspects of the present invention relate generally to indexing of electronically stored documents and, more particularly, to indexing of electronically stored documents using key-value pairs (KVP). According to aspects of the present invention, documents are analyzed and KVPs are extracted from the contents of each of the documents. The KVPs are used to generate content indices for the documents. In embodiments, each index is enhanced to facilitate searching of the documents based on KVPs. In this manner, implementations of the invention improve content search efficiency and accuracy upon business documents and user experience. As used herein, unless otherwise indicated, "document" or "documents" refer to electronically stored documents.

Implementations of the invention are necessarily rooted in computer technology. For example, the steps of classifying, extracting, and enhancing (as described below) are computer-based and cannot be performed in the human mind, because each step involves a machine learning model. Training and using a machine learning model are, by definition, performed by a computer and cannot practically be performed in the human mind (or with pen and paper) due to the complexity and massive amounts of calculations involved. For example, machine learning, as exemplified below, may have millions or even billions of weights that represent connections between nodes in different layers of the model. Values of these weights are adjusted, e.g., via backpropagation or stochastic gradient descent, when training the model and are utilized in calculations when using the trained model to generate an output in real time (or near real time). Given this scale and complexity, it is simply not possible for the human mind, or for a person using pen and paper, to perform the number of calculations involved in training and/or using a machine learning model.

It should be understood that, to the extent implementations of the invention collect, store, or employ personal information provided by, or obtained from, individuals (for example, addresses, account numbers, names, etc.), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
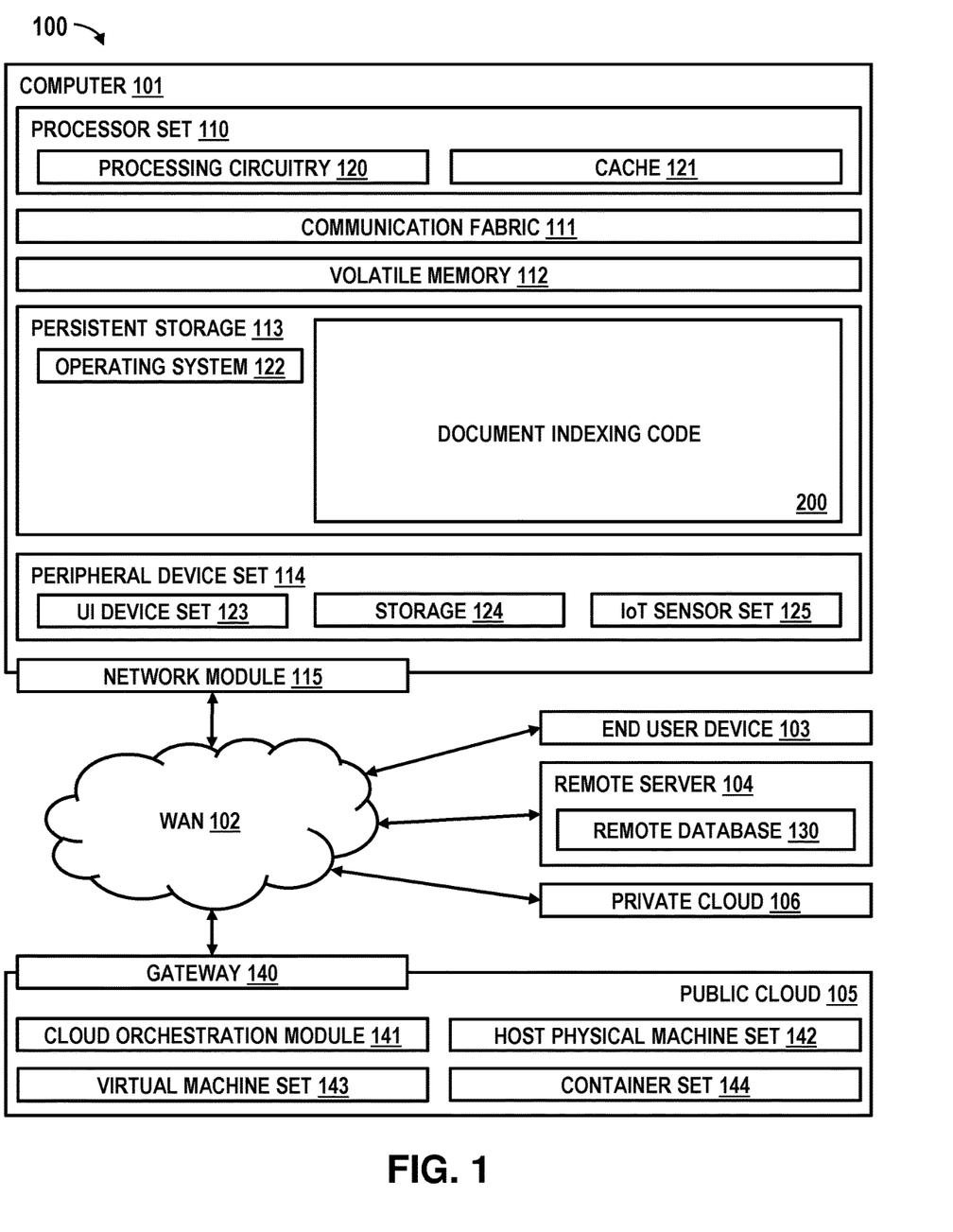
FIG. 1 depicts a computing environment in accordance to aspects of the present invention.

Computing environment 100 contains an example of an environment for the execution of at least some of the computer code involved in performing the inventive methods, such as document indexing code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
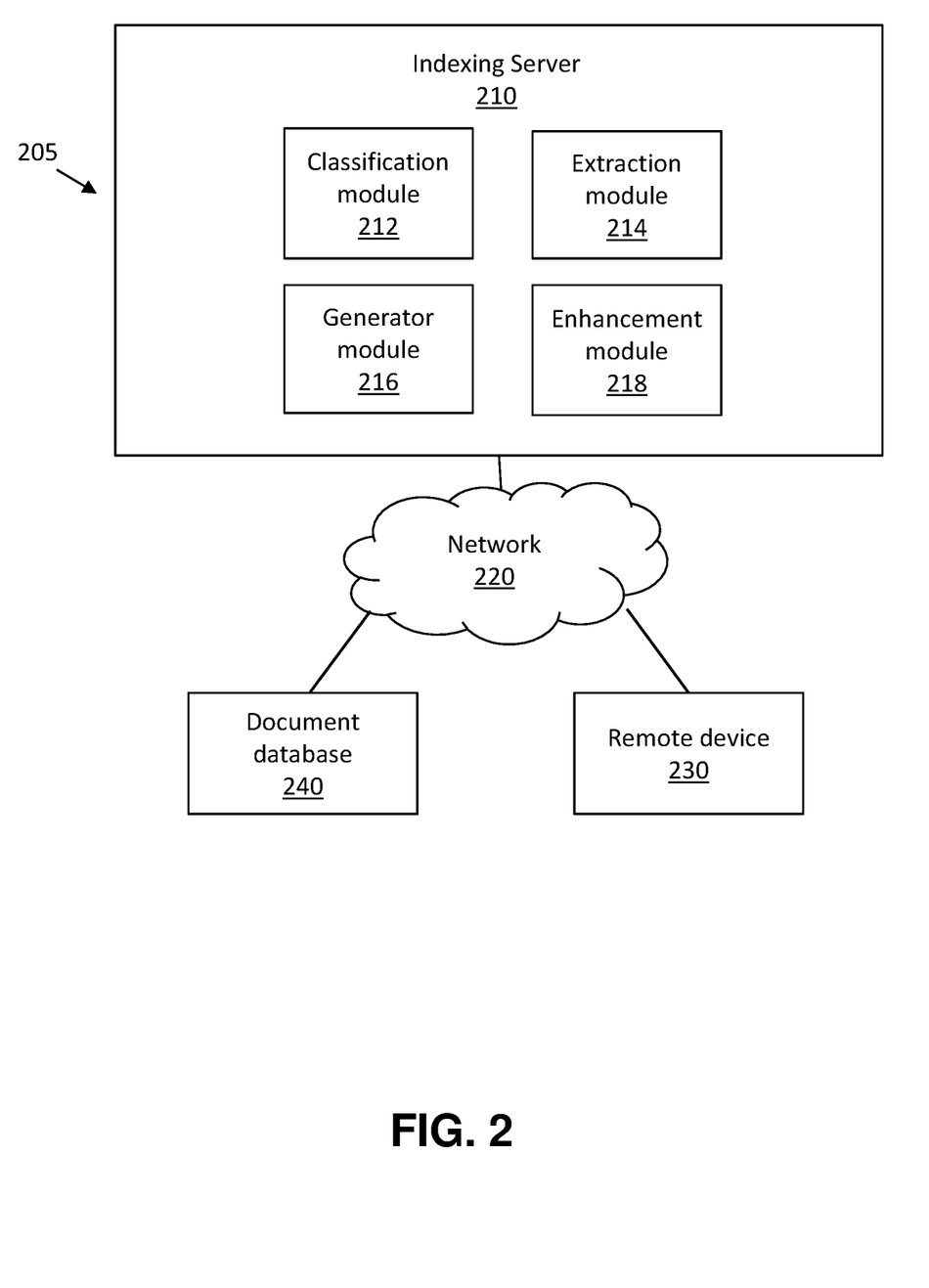
FIG. 2 shows a block diagram of an exemplary environment in accordance with aspects of the present invention.

FIG. 2 shows a block diagram of an exemplary environment 205 in accordance with aspects of the invention. In embodiments, the environment 205 includes a document indexing server 210, a remote device 230, and a document database 240. The indexing server 210, the remote device 230, and the document database 240 are in communication over a network 220. In an example, the indexing server 210 comprises one or more instances of the computer 101 of FIG. 1, or one or more virtual machines or one or more containers running on one or more instances of the computer 101 of FIG. 1. The network 220 may comprise one or more networks such as the WAN 102 of FIG. 1. The remote device 230 may comprise one or more instances of the EUD 103 of FIG. 1. The document database 240 may comprise one or more instances of the remote database 130 of FIG. 1.

Figure 3:
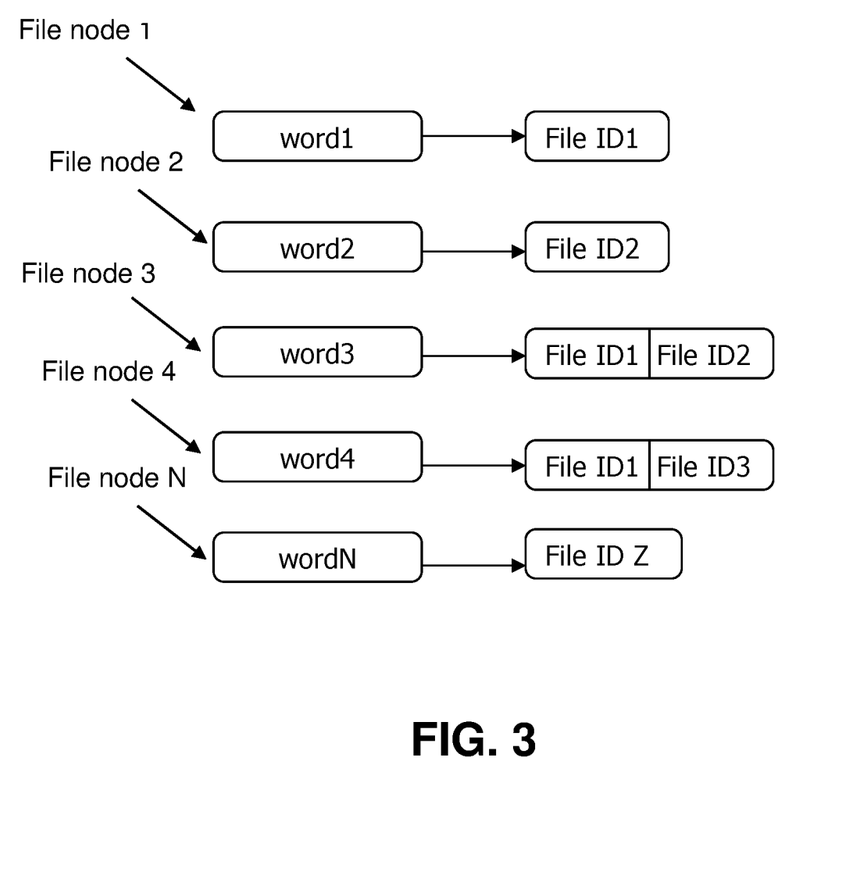
FIG. 3 shows exemplary indexing of documents in a document database available for keyword searching in accordance to aspects of the present invention.

In embodiments, the document database 240 of FIG. 2 includes indexed documents that are stored in the document database 240. In embodiments, the documents include business records that are created and received as part of a business daily operation. The documents may include identification cards, driver's licenses, invoices, contracts, business cards, mailing labels, letter, etc. In embodiments, the documents may be indexed by the words in the document (content index). The content index relates each word in the documents to the file ID of the document(s) containing that word. Each word representing a file node. For example, as shown in FIG. 3, word1 is found file ID1 (word1→file ID 1), word2 is in file ID2 (word2→file ID2), word3 is in file ID1 and file ID2 (word3→file ID1 and file ID2), and word4 is in file ID1 and file ID3 (word4→file ID1 and file ID3). Thus, the document database 240 may be searched by keywords. In the example of FIG. 3, a keyword search of word1 would return the document of file ID1; a keyword search of word2 would return the document of file ID2, a keyword search of word3 would return the documents of file ID1 and ID2, and a keyword search of word3 would return the documents of file ID1 and ID3. Overall, a keyword search of wordN would return the document of File IDZ In embodiments, the remote device 230 of FIG. 2 is used by a user to access the documents in the document database 240. For example, the remote device 230 may be used to perform a content search of the documents in the document database 240.

In embodiments, the indexing server 210 of FIG. 2 provides KVP indices for the documents in the document database 240. In particular, the indexing server 210 comprises a classification module 212, an extraction module 214, a generator module 216, and an enhancement module 218, each of which may comprise modules of the code of block 200 of FIG. 1. The indexing server 210 enhances the content index of the document database 240 with a KVP content index to allow the document database 240 to be searched using KVP in addition to keywords. The modules may include routines, programs, objects, components, logic, data structures, and so on that perform particular tasks or implement particular data types that the code of block 200 uses to carry out the functions and/or methodologies of embodiments of the invention as described herein. These modules of the code of block 200 are executable by the processing circuitry 120 of FIG. 1 to perform the inventive methods as described herein. The indexing server 210 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2. In embodiments, the indexing server indexes the content of documents using key-value pairs to facilitate efficient content searching of the documents.

In embodiments, the classification module 212 receives a document and evaluates the document to determine a document type. The document type may be, e.g., identification cards, driver licenses, invoices, contracts, business cards, mailing labels, letters, purchase orders. The document type may be determined by analyzing the document (e.g., analyzing using optical character recognition (OCR) on the document), the layout of the document, the text content of the document, or combinations thereof. In embodiments, the classification module may be a machine learning model that is trained to evaluate and determine the document type. The machine learning model may be, but is not limited to, a decision tree, a random forest, an artificial neural network, a support vector machine (SVM), etc. Although the classification module 212 is included in the indexing server 210, embodiments are not limited. In other embodiments, the indexing server 210 may not include the classification module 212. When the classification module 212 is included in the indexing server, the classification module 212 enables the extraction module 214 to more precisely extract KVPs from the documents. For example, after the classification module 212 classifies the document type as an invoice, the extraction module 212 would know that there must be an invoice number regardless of how the number is labeled, e.g., "Invoice No.: 1234", "Invoice #: 1234", "Invoice No.—1234", "Invoice No|1234", etc.

Figure 4:
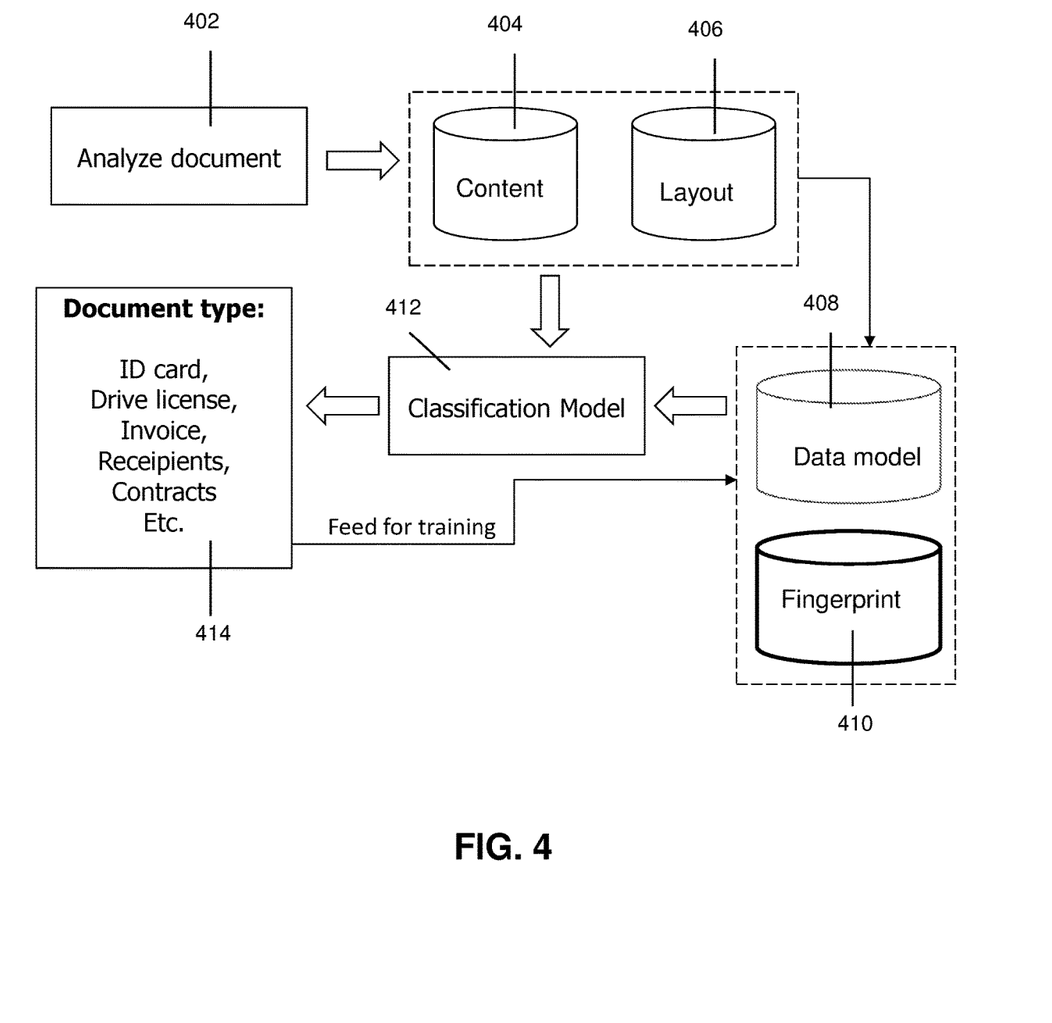
FIG. 4 shows a training method for a classification model according to in accordance to aspects of the present invention.

An exemplary training process of a machine learning model for the classification module 212 is shown in FIG. 4. In the exemplary training process, the document is analyzed 402 to determine the content 404 and layout 406 of the type of document. From the analysis 402 and determination of the content 404 and the layout 406, the data model 408 and fingerprint 410 for each type of document is determined. The data model 408 stores the characteristics of each document type, e.g., keywords and layouts (e.g., there are two tables on a first page, there is a barcode on an upper right corner of the first page, etc.) of the document. The fingerprint is also a unique identifier for a corresponding document type. For example, a title "Invoice" in bold font indicates the document type as an invoice. The classification module 212 can determine the document type as an invoice by only checking the title without needing to check the whole content/layout of a document or image. The content 404, layout 406, data model 408, and fingerprint 410 are then used to iteratively train the classification model 412 to determine the document type 414 for future classifications.

In embodiments, the extraction module 214 reviews the document and extracts key-value pair(s) (KVP) from the content of the document. Depending on the type of documents, the extraction module 214 extract certain KVPs. The extraction module 214 may be a machine learning model that is trained to extract KVPs from the document. The machine learning model of the extraction module 214 is trained to identify whether words within the document are a key or a value. Further, the extraction module 212 matches the key and the value to form a KVP. For example, for an invoice, the extraction module 214 may be trained to extract an invoice number, date, address, amount, terms, telephone number, etc. Exemplary techniques to extract KVP from documents include, but are not limited to, object detection or key normalization. Object detection refers to named entity recognition. For example, extraction module 214 can determine that a word or phrase is a name of a person, email, phone number, address, company name, country, city, etc., and then analyze the key near this phrase to extract a KVP. Key normalization refers to analyzing keys first, then determine the values near the keys. For example, "mail to"/ "email"/"email address"/"send email to"/"contact"/"company email" may all mean "email address". The extraction module 214 first locates the keys, then analyzes the values near these keys to extract KPVs.

The extraction module 214 may use several methods to determine whether a word is associated with a phrase. In one method, aliases may be determined for a key. For example, for e-mail addresses, "mail to", "email", "email address", "send email to", "contact", "company email" may be defined as aliases of e-mail addresses. When analyzing the content, the extraction module 214 will check whether there is any phrase that match one of the aliases. In another method, the extraction module 214 may analyze the layout of the documents and check for gaps between the words. The words with smaller gaps in between are determined as a phrase. In a further method, the extraction module 214 may use a Named Entity Recognizer technology to identify that "Los Angeles" should be a city, and "137 W San Bernardino Rd." should be an address.

Figure 5:
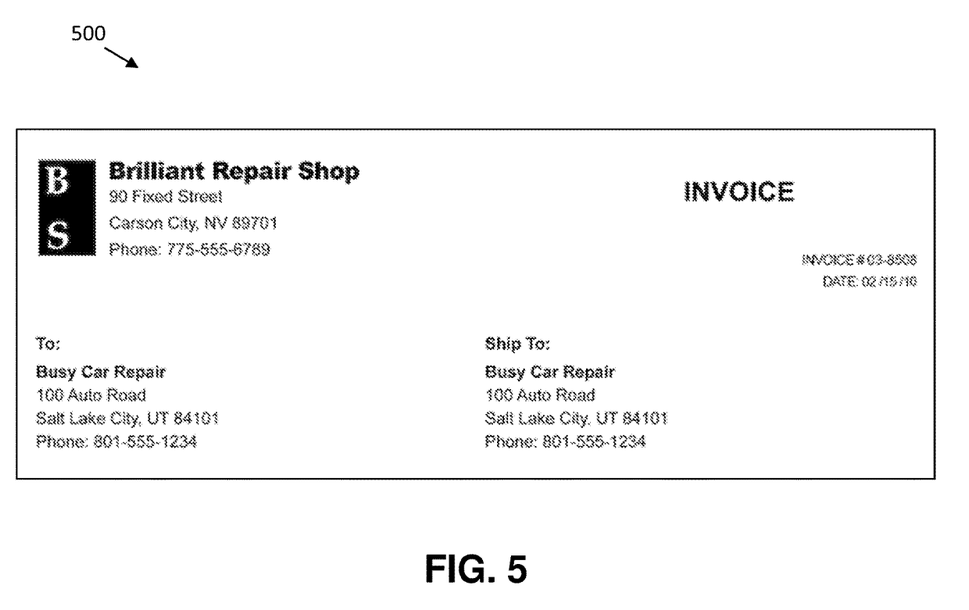
FIG. 5 shows an exemplary document comprising an invoice in accordance to aspects of the present invention.

An exemplary invoice 500 is shown in FIG. 5. In FIG. 5, the extraction module 214 may extract the following KVP (key=value): invoice number=03-8508, date=Feb. 15, 2010, phone=775-555-6789, phone=801-555-1234, ship to=Busy Car Repair.

Figure 6:
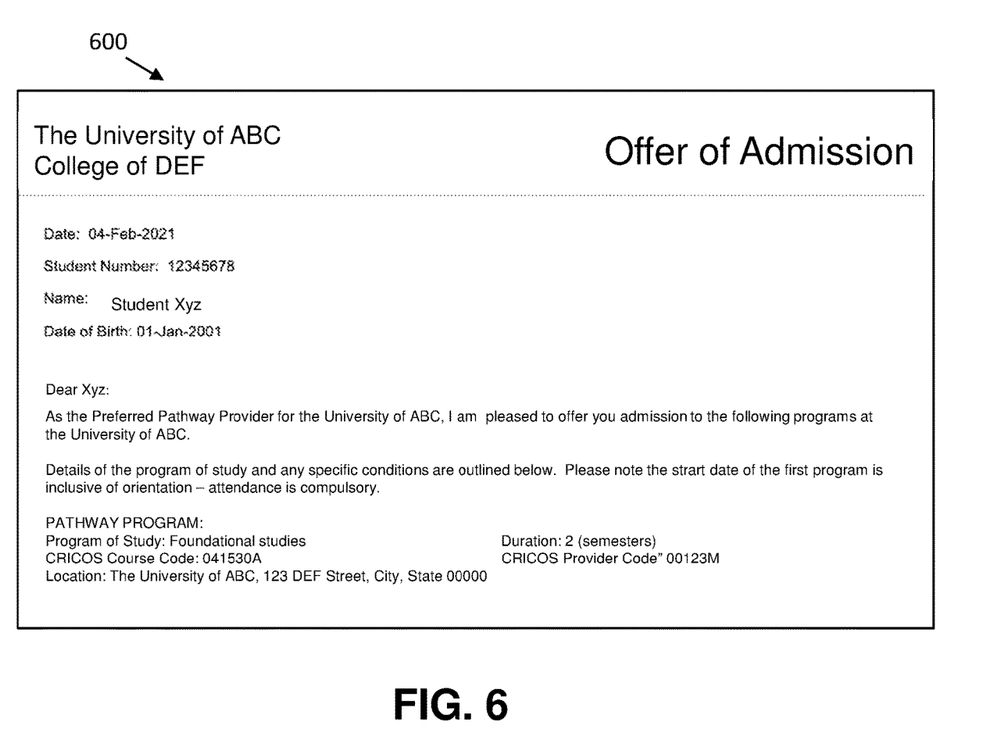
FIG. 6 shows an exemplary document comprising a letter in accordance to aspects of the present invention.

An exemplary letter 600 is shown in FIG. 6. In FIG. 6, the extraction module 214 may extract the following KVP (key=value): date=4 Feb. 2021, student number=12345678, name=Student Xyx, date of birth=1 Jan. 2001.

Figure 7:
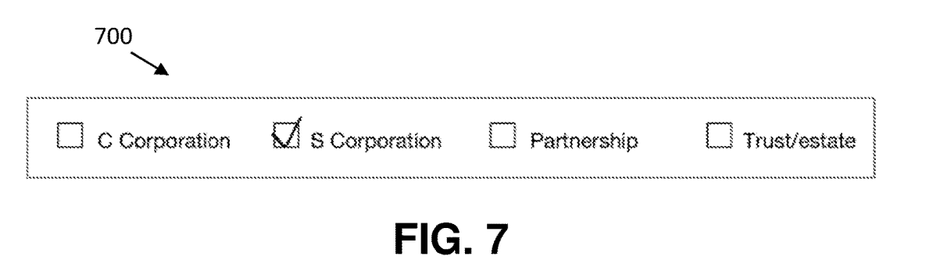
FIG. 7 shows an exemplary document comprising a check box form in accordance to aspects of the present invention.

An exemplary check box form 700 is shown in FIG. 7. In FIG. 7, the extraction module 214 may extract the following KVP: S Corporation=true.

The generator module 216 obtains a content index for the documents in the document database 240. The generator module 216 analyzes the contents of the documents and generates the content index or retrieves the content index from the document database 240 in response to the document database 240 already including the content index. The content index includes a plurality of file nodes, each file node relates a word to documents containing that word. The content index is organized by words, and points to a list of files that contain the same word. FIG. 3 shows an exemplary content index for the document database 240. As shown in FIG. 3, word1 is found in File ID1; word2 is found in file ID2; word3 is found in File ID1 and File ID2, and word4 is found in File ID1 and File ID4. Thus, the content index relates the word (i.e., wordN) with the documents (file ID Z) which contains wordN.

The enhancement module 218 uses the content index obtained by the generator module 216 and adds enhancements to each file node of the content index. In particular, the enhancement module 218 adds a phrase in supplement of the word at each file node and tags for each file node to represent the phrase information. The phrase comprises the word and puts the associated word in its context. For example, the word "ship" in an invoice may be "ship to" or "ship from". Thus, the phrase "ship to" or "ship from" adds additional context to the word "ship". The content index may also indicate the location of the word in each file node, e.g., hello→11[4]→22[14] which means 'hello' is the 4th word in file ID 11 and is the 14th word in file ID 22. When extracting KVP, location of the keys and the values are also known. The enhancement module 218 can check whether the word and KVP's locations are overlapped to determine whether a phrase is needed for the word.

The tags indicate, without limitations, the role of the word or phrase (i.e., whether the word or phrases is a key or a value), the type of data of the word or phrase (e.g., string, integer, date, time, currency, address), and the reference. The reference refers the associate value in response to the word or phrase being a key, and the associated key in response to the word or phrase being a value. Of course, KVP is not available for all words in the document. Accordingly, enhancements are not available for all file nodes. Additionally, not all words in a document need a phrase to give it additional context. Thus, not all words are enhanced with a phrase, even though that word is part of a KVP.

Figure 8:
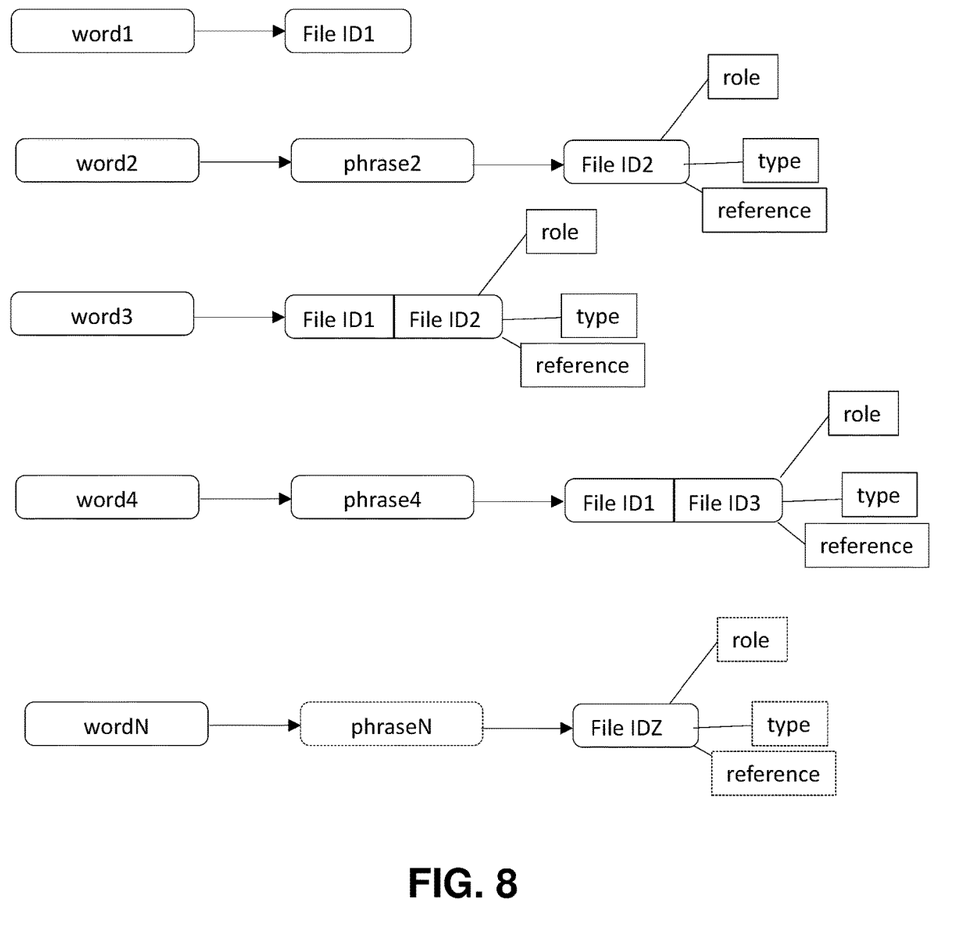
FIG. 8 shows an exemplary KVP document index in accordance to aspects of the present invention.

For example, as shown in FIG. 8, where applicable, each file node of FIG. 3 is enhanced with a phrase and/or tag. Phrases and tags are added to file nodes 2 and 4. Because no KVP is available for file node 1, no enhancement is added to file node 1. For node 3, because there is no phrase associated with word3 and a KVP is extracted for word3, tags are added without a phrase. Thus, for file node N, in response to a KVP being extracted for wordN, tags are then added. Also, in response to a phrase (phraseN) being available for wordN, phraseN is then added to file node N. Because wordN need not be part of a KVP, the tag boxes and the phrase box are shown in dashed line.

Figure 9:
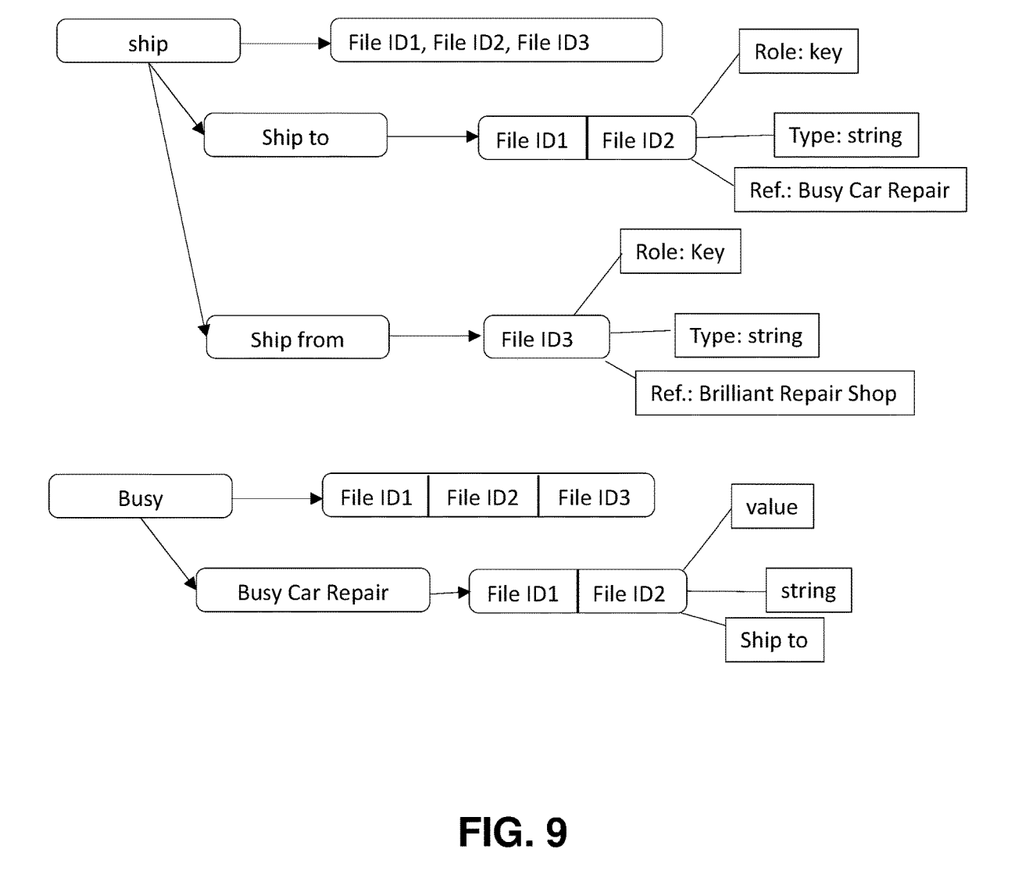
FIG. 9 shows specific examples of enhancements made to the words "ship" and "busy" in a document index in accordance to aspects of the present invention.

FIG. 9 shows specific examples of enhancements made to the words "ship" and "busy". As illustrated in FIG. 9, the word "ship" is enhanced with phrases "ship to" and "ship from", where "ship to" is found in File ID1 and File ID2, while "ship from" is found in File ID3. Furthermore, the phrase "ship to" is tagged as having the role of a key, the type of a string, and a reference of Busy Car Repair (i.e., the reference is the value associated with the key "ship to"). Likewise, the phrase "ship from" is tagged as having the role of a key, the type of a string, and a reference of Brilliant Repair Shop (i.e., the reference is the value associated with the key "ship from"). As also illustrated in FIG. 9, the word "Busy" is enhanced with phrase "Busy Car Repair", where "Busy Car Repair" is found in File ID1 and File ID2. Furthermore, the phrase "Busy Car Repair" is tagged as having the role of a value, the type of a string, and a reference of "ship to" (i.e., the reference is the key associated with the value "Busy Car Repair").

In some cases, a word may include two difference phrases associated with it. In those cases, the file node may be separated into two different file nodes. FIG. 9 illustrates a specific example of that situation where the word "ship" in the document is associated with the phrases "ship to" and "ship from". Although the word "ship" is found in FileID1, FileID2, and File ID3, "ship to" is only found in File ID1 and File ID2, and "ship from" is only found in File ID3.

Figure 10:
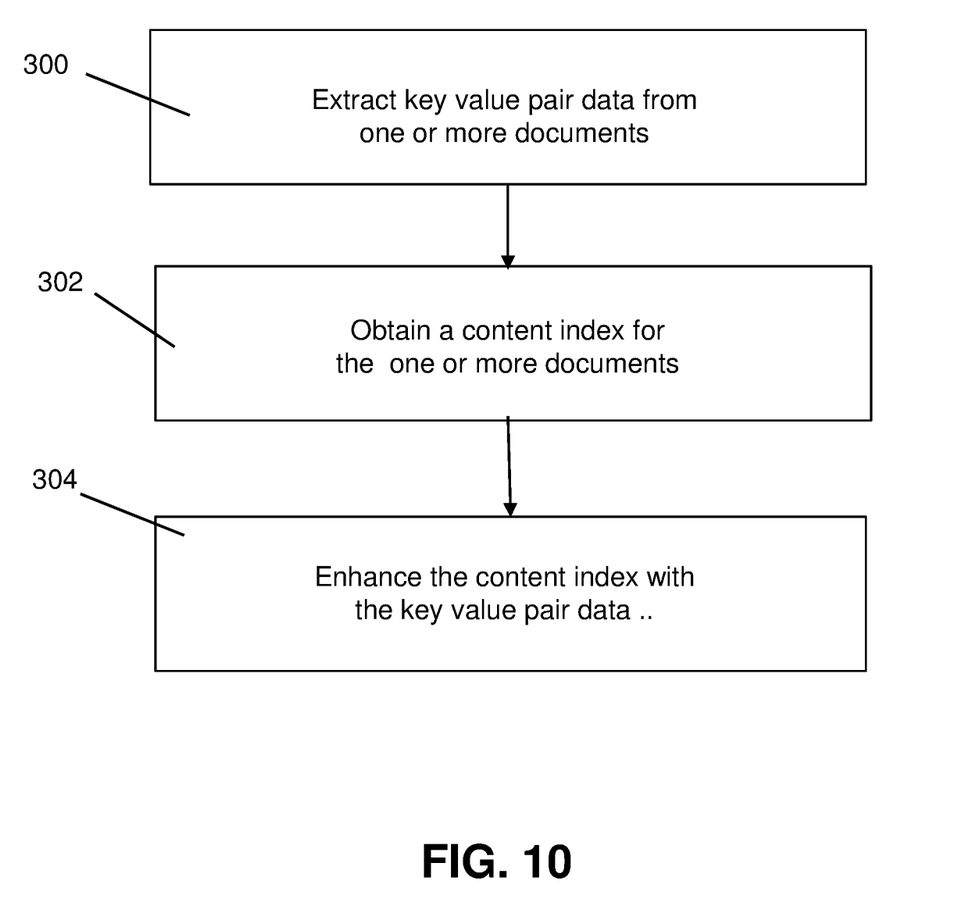
FIG. 10 shows a flowchart of an exemplary method in accordance to aspects of the present invention.

FIG. 10 shows a flowchart of an exemplary method in accordance with aspects of the present invention. Steps of the method may be carried out in the environment of FIG. 2 and are described with reference to elements depicted in FIG. 2.

At step 300, the key value pairs data is extracted from one or more documents. In embodiments, as described with respect to FIG. 2, the extraction module 214 performs this step.

At step 302, a content index for the one or more documents is obtained. In embodiments, and as described with respect to FIG. 2, the generation module 216 performs this step.

At step 304, the content index is enhanced with the key value pairs data. In embodiments, as described with respect to FIG. 2, the enhancement module 218 performs this step.

The indexing server 210 allows the documents in the document database 240 to be indexed using KVPs. The KVP content index may be saved on the document database 240 or another database for searching. The KVP content index allows a user to execute a content search using KVPs in addition to keywords. Thus, for example, a keyword search for "invoice number" and "038508" would return all documents including the phrase "invoice number" and the number "038508". In that case, the number "038508" may be an address number and not the invoice number. However, a KVP search of "invoice number=038508" would return a document where the invoice number is 038508. In embodiments, a user may execute a KVP search of documents in the documents data base 230 by entering a KVP query in the remote device 230.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/ or the service provider can receive payment from the sale of advertising content to one or more third parties.

In still additional embodiments, the invention provides a computer-implemented method, via a network. In this case, a computer infrastructure, such as computer 101 of FIG. 1, can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising
extracting, by a processor set, key value pair (KVP) data from one or more documents by utilizing a machine learning model that is trained by identifying whether words within the one or more documents are a key or a value by performing key normalization by analyzing the words of the one or more documents to determine that the key is one of a mail to, an email, an email address, send email to, contact, and a company email and determine that the value is in a predetermined vicinity of the key;
matching the key and the key value to form the KVP data;
obtaining, by the processor set, a content index for the one or more documents; and
enhancing, by the processor set, the content index with the KVP data to provide a KVP content index.

2. The computer-implemented method of claim 1, further comprises:
determining a document type for the one or more documents.

3. The computer-implemented method of claim 2, wherein the document type comprises one or more document type selected from the group consisting of identification card, a driving license, invoice, contract, business card, mailing label, letter, and purchase order, and the enhancing the context index with the KVP data comprises adding an enhancement to each file node of the context index to provide the KVP context index.

4. The computer-implemented method of claim 2, wherein the determining is accomplished by the machine learning model which is further trained by analyzing the one or more documents, the layout of the one or more documents, and the text content of the one or more documents, and the enhancement comprises a phrase in supplement of a word.

5. The computer-implemented method of claim 1, wherein the extracting involves object detection or key normalization.

6. The computer-implemented method of claim 1, wherein the KVP data comprises one or more data selected from the group consisting of invoice number, date, address, amount, terms, and telephone number.

7. The computer-implemented method of claim 1, wherein the obtaining comprises retrieving the content index from a database.

8. The computer-implemented method of claim 1, wherein the obtaining comprises analyzing the one or more documents and generating the content index.

9. The computer-implemented method of claim 1, wherein the enhancing comprises adding a phase and tags to a word of the content index.

10. The computer-implemented method of claim 9, wherein the tags comprise a role of the word or phrase, a type of data of the word or phrase, and a reference of the word or phrase.

11. The computer-implemented method of claim 10, wherein the role indicates whether the word or phrase is the key or the value.

12. The computer-implemented method of claim 10, wherein the type of data indicates whether the word or phrase comprises one or more word or phrase selected from the group consisting of a string, an integer, a date, a time, a currency, and an address.

13. The computer-implemented method of claim 10, wherein the reference indicates the value associated with the phrase or word or the key associated with the word or phrase.

14. A computer program product comprising one or more computer readable storage media having program instructions collectively stored on the one or more computer readable storage media, the program instructions executable to:

extract key value pair (KVP) data from one or more documents by utilizing a machine learning model that is trained by identifying whether words within the one or more documents are a key or a value by performing key normalization by analyzing the words of the one or more documents to determine that the key is one of a mail to, an email, an email address, send email to, contact, and a company email and determine that the value is in a predetermined vicinity of the key;

match the key and the value to form the KVP data;

obtain a content index for the one or more documents; and enhance the content index with the KVP data to provide a KVP content index.

15. The computer program product of claim 14, wherein the program instructions further executable to:

determine a document type for the one or more documents.

16. The computer program product of claim 15, wherein the determining is performed by the machine learning model, and the enhancing the context index with the KVP data comprises adding an enhancement to each file node of the context index to provide the KVP context index.

17. The computer program product of claim 14, wherein the KVP data comprises one or more data selected from the group consisting of invoice number, date, address, amount, terms, and telephone number, and the enhancement comprises a phrase in supplement of a word.

18. A system comprising a processor set, one or more computer readable storage media, and program instructions collectively stored on the one or more computer readable storage media, the program instructions executable to:

extract key value pair (KVP) data from one or more documents by utilizing a machine learning model that is trained by identifying whether words within the one or more documents are a key or a value by performing key normalization by analyzing the words of the one or more documents to determine that the key is one of a mail to, an email, an email address, send email to, contact, and a company email and determine that the value is in a predetermined vicinity of the key;

match the key and the value to form the KVP data;

obtain a content index for the one or more documents; and enhance the content index with the KVP data to provide a KVP content index.

19. The system of claim 18, wherein the program instructions are further executable to:

determine a document type for the one or more documents wherein the enhancing the context index with the KVP data comprises adding an enhancement to each file node of the context index to provide the KVP context index.

20. The system of claim 19, wherein the enhancement comprises a phrase in supplement of a word.

* * * * *